US009362838B1

(12) United States Patent
Balogh et al.

(10) Patent No.: US 9,362,838 B1
(45) Date of Patent: Jun. 7, 2016

(54) ELECTRICAL SYSTEM FOR CONNECTING MOBILE UNIT TO BASE UNIT

(71) Applicants: Daniel J. Balogh, Menasha, WI (US); Christopher L. Blohm, California, MD (US); Christopher J. Folger, Oshkosh, WI (US)

(72) Inventors: Daniel J. Balogh, Menasha, WI (US); Christopher L. Blohm, California, MD (US); Christopher J. Folger, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 553 days.

(21) Appl. No.: 13/790,768

(22) Filed: Mar. 8, 2013

(51) Int. Cl.
*H02J 1/00* (2006.01)
*H02M 5/42* (2006.01)
*H02M 7/04* (2006.01)

(52) U.S. Cl.
CPC . *H02M 5/42* (2013.01); *H02M 7/04* (2013.01)

(58) Field of Classification Search
CPC ........ H01L 31/0583; H02J 3/32; H02J 3/382; H02J 9/061; H02J 1/08
USPC .......................................................... 307/72
See application file for complete search history.

(56) References Cited

U.S. PATENT DOCUMENTS

| 8,963,374 | B2 * | 2/2015 | Wang | 307/81 |
| 2005/0151517 | A1 * | 7/2005 | Cook et al. | 323/207 |
| 2008/0157540 | A1 * | 7/2008 | Fattal | B60L 11/123 290/40 R |
| 2008/0157600 | A1 * | 7/2008 | Marlenee | H02J 7/1415 307/66 |
| 2008/0164850 | A1 * | 7/2008 | Ayana | H02J 3/005 322/1 |
| 2010/0105259 | A1 * | 4/2010 | Wejrzanowski et al. | 440/3 |
| 2010/0116571 | A1 * | 5/2010 | Suzuki | 180/65.25 |
| 2010/0144219 | A1 | 6/2010 | Balogh et al. | |
| 2010/0204860 | A1 * | 8/2010 | Mitsutani | 701/22 |
| 2010/0289516 | A1 * | 11/2010 | Mitsutani et al. | 324/764.01 |
| 2011/0195618 | A1 | 8/2011 | Arbuckle et al. | |
| 2011/0204851 | A1 * | 8/2011 | Manotas, Jr. | B60L 11/1816 320/128 |
| 2011/0292703 | A1 * | 12/2011 | Cuk | 363/126 |
| 2011/0295456 | A1 * | 12/2011 | Yamamoto et al. | 701/22 |
| 2012/0109443 | A1 * | 5/2012 | Takahashi et al. | 701/22 |
| 2012/0112702 | A1 * | 5/2012 | Steigerwald et al. | 320/137 |
| 2012/0139350 | A1 * | 6/2012 | Wang | 307/82 |
| 2012/0267955 | A1 * | 10/2012 | Zhan et al. | 307/31 |
| 2013/0030637 | A1 * | 1/2013 | Yamamoto et al. | 701/22 |
| 2013/0297138 | A1 * | 11/2013 | Fushiki | 701/22 |
| 2014/0111000 | A1 * | 4/2014 | Cooney | 307/9.1 |
| 2014/0203634 | A1 * | 7/2014 | Sugiyama et al. | 307/10.1 |

* cited by examiner

*Primary Examiner* — Thienvu Tran
*Assistant Examiner* — Brian K Baxter
(74) *Attorney, Agent, or Firm* — Andrus Intellectual Property Law, LLP (57) ABSTRACT

An electrical power system is connectable to an AC base power supply to provide AC base electrical power to a mobile unit. The AC mobile unit electrical power is provided in one embodiment without pass-through of AC electrical power which would otherwise bypass an AC/DC inverter. In one implementation, a marine electrical power system is connectable to an AC shore power supply to provide AC shore electrical power to a docked marine vessel.

21 Claims, 12 Drawing Sheets

ELECTRICAL SYSTEM FOR CONNECTING MOBILE UNIT TO BASE UNIT

BACKGROUND AND SUMMARY

The disclosure relates to electrical systems, and more particularly to an electrical system connectable to an AC base power supply to provide AC base electrical power to a mobile unit.

Electrical systems connectable to an AC base supply to provide AC base electrical power to a mobile unit are known in the prior art. In one example, a marine electrical power system is connectable to an AC shore power supply to provide AC shore electrical power to a docked marine vessel. These systems typically pass through the AC power from the shore supply to the vessel AC power system as well as using a synchronous inverter as a parallel AC source. Other types of electrical systems are known for connecting an AC base power supply to provide AC base electrical power to a mobile unit, for example semi-tractor/trailers, RV's (recreational vehicles), industrial work trucks, and so on.

The present disclosure arose during continuing development efforts in the above technology.

DETAILED DESCRIPTION

Prior Art

Figure 1:
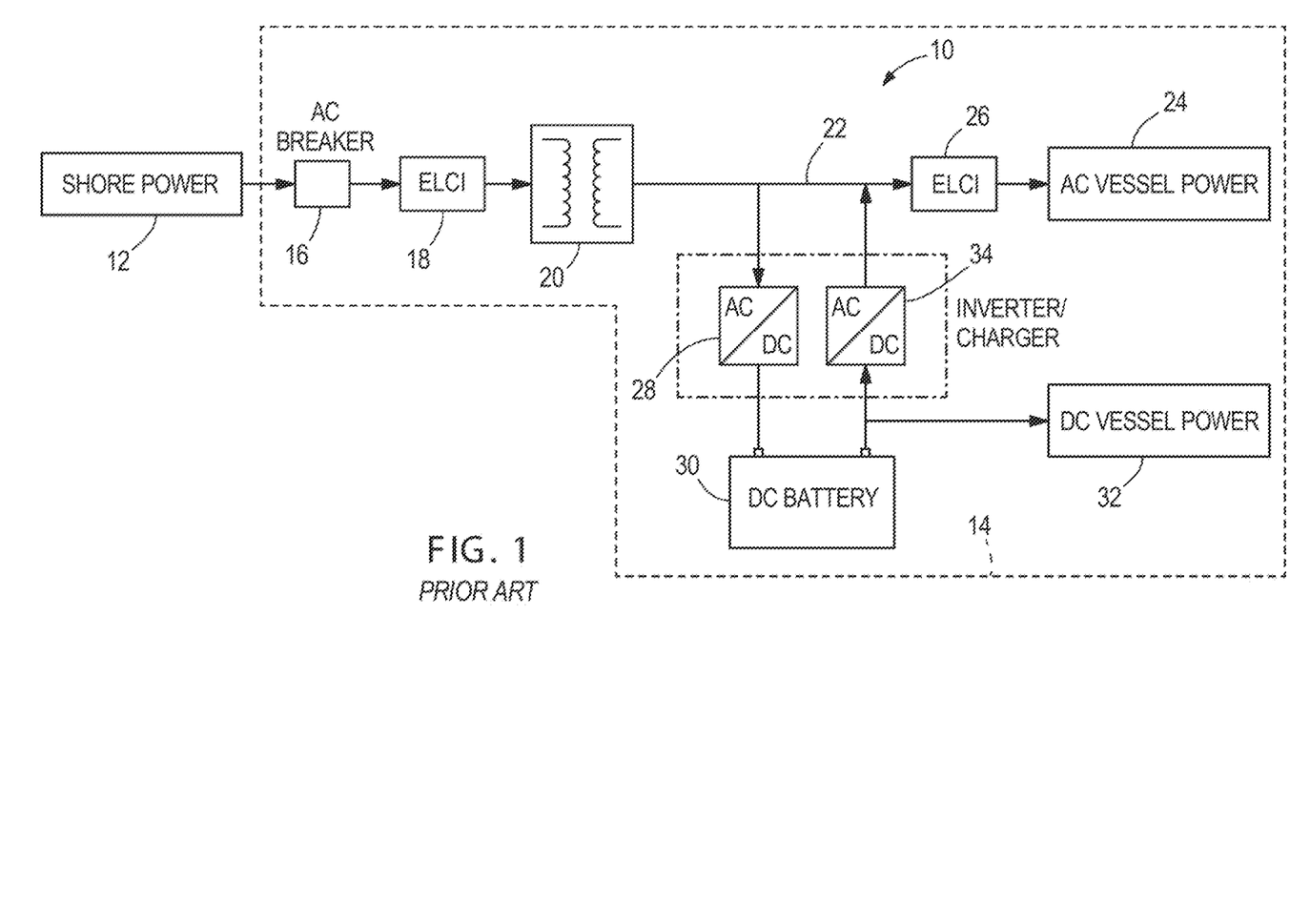
FIG. 1 is a circuit diagram showing a marine electrical power system known in the prior art.

FIG. 1 shows a marine electrical power system 10 known in the prior art. The system is connectable to an AC shore power supply 12 to provide AC shore electrical power to a docked marine vessel 14. The system may include an AC circuit breaker 16 and an electrical leakage current interrupt (ELCI) 18 in accordance with boating regulations as may be required. An isolation transformer 20 receives AC shore electrical power and outputs AC electrical power which is passed through at 22 to provide AC vessel power at AC vessel power supply 24 which may include an ELCI module 26. The AC electrical power from isolation transformer 20 is also provided to an AC/DC inverter 28 to charge battery 30 which outputs DC electrical power to the DC vessel power supply 32, and also outputs DC electrical power to AC/DC inverter 34 which supplies AC electrical power to the AC vessel power supply 24 in parallel with the pass-through AC electrical power at 22 from isolation transformer 20.

Present Disclosure

Figure 2:
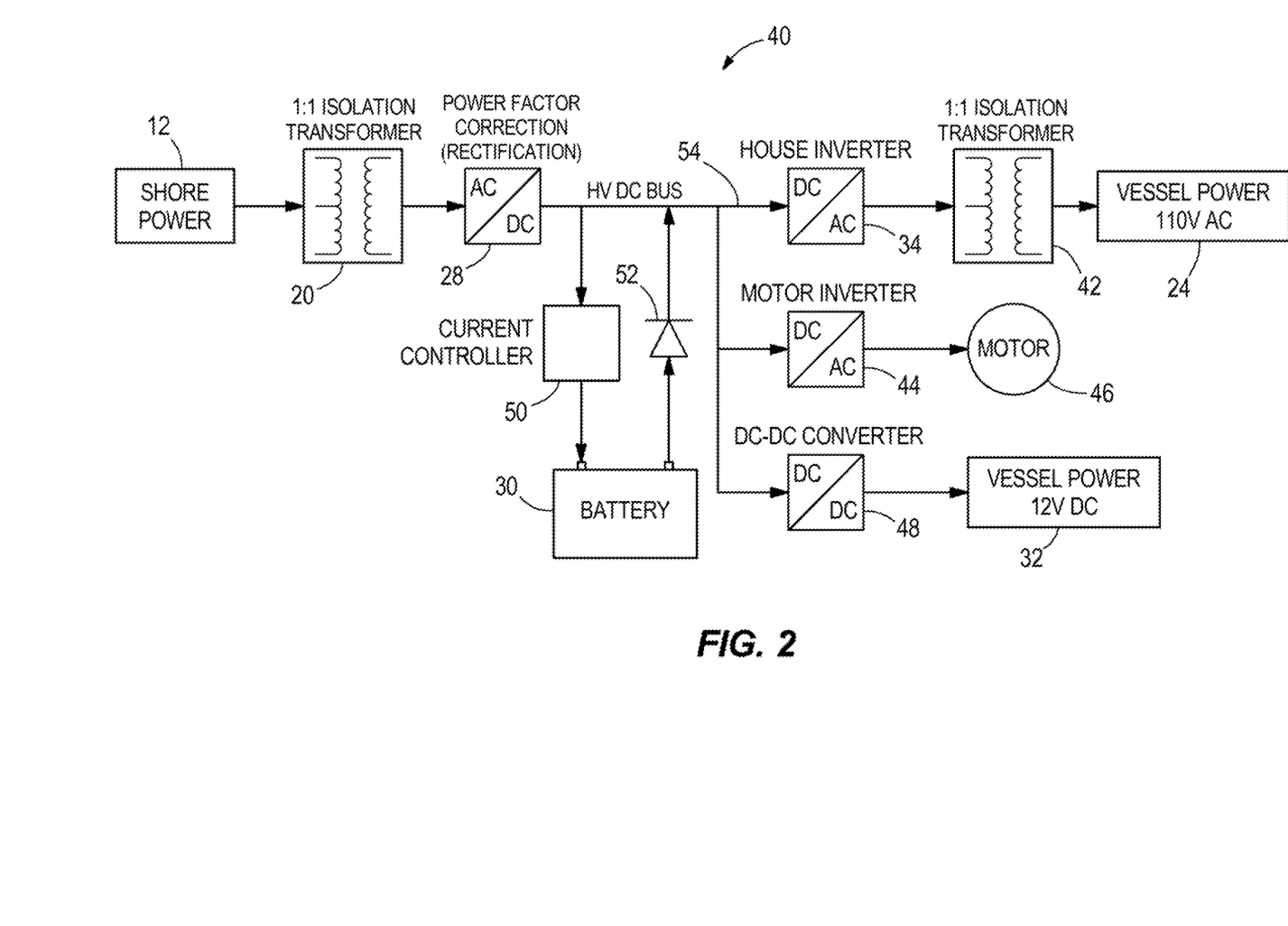
FIG. 2 is a circuit diagram showing an electrical power system in accordance with the present disclosure, which may be a marine electrical power system.

FIG. 2 shows a marine electrical power system in accordance with the present disclosure, and uses like references numerals from above where appropriate to facilitate understanding. FIG. 2 shows a marine electrical power system 40 connectable to AC shore power supply 12 to provide AC shore electrical power to a docked marine vessel 14. Isolation transformer 20 receives AC shore electrical power and outputs AC electrical power. AC/DC inverter 28 receives AC electrical power from isolation transformer 20 and outputs DC electrical power. DC/AC inverter 34 receives DC electrical power and outputs AC electrical vessel power for the marine vessel which may be supplied through isolation transformer 42 to the AC vessel power supply 24. In FIG. 2, the AC electrical vessel power is provided to power supply 24 without pass-through of AC electrical power from isolation transformer 20 which would otherwise bypass AC/DC inverter 28 as in FIG. 1. Instead, in FIG. 2, all of the AC electrical vessel power to power supply 24 is provided in series through AC/DC inverter 28 without a parallel output connection, as at 22 in FIG. 1, from isolation transformer 20 which would otherwise provide AC electrical vessel power which would bypass AC/DC inverter 28. In FIG. 2, all of the AC electrical vessel power to power supply 24 results from two inversions comprising a first inversion from AC to DC and AC/DC inverter 28, and a second inversion from DC to AC at DC/AC inverter 34, all without a direct connection of AC electrical power from isolation transformer 20, such that all of the AC electrical vessel power to power supply 24 is first inverted from AC to DC and then re-inverted to DC to AC.

The DC/AC inverter 34 may include an isolation transformer, e.g. at 42. The isolation transformer 20 receiving AC shore electrical power is a first isolation transformer, and the isolation transformer 42 of the DC/AC inverter 34 is a second isolation transformer. In one embodiment, first isolation transformer 20 is a step-up transformer, and second isolation transformer 42 is a step-down transformer. A further DC/AC inverter 44 may be provided, for example to drive an electric propulsion motor 46 in implementation in a marine hybrid drive. A DC/DC converter 48 receives the electrical power and outputs DC electrical power for the marine vessel, for example to DC vessel power supply 32. In one embodiment, DC/DC converter 48 is a step-down converter.

In FIG. 2, battery 30 receives DC electrical power from AC/DC inverter 28, which may be received through a current controller 50, and outputs DC electrical power, which may be output through diode 52. In various embodiments, DC/AC inverter 34 receives DC electrical power at least from battery 30, or at least from AC/DC inverter 28, or from both battery 30 and AC/DC inverter 28.

Figure 3:
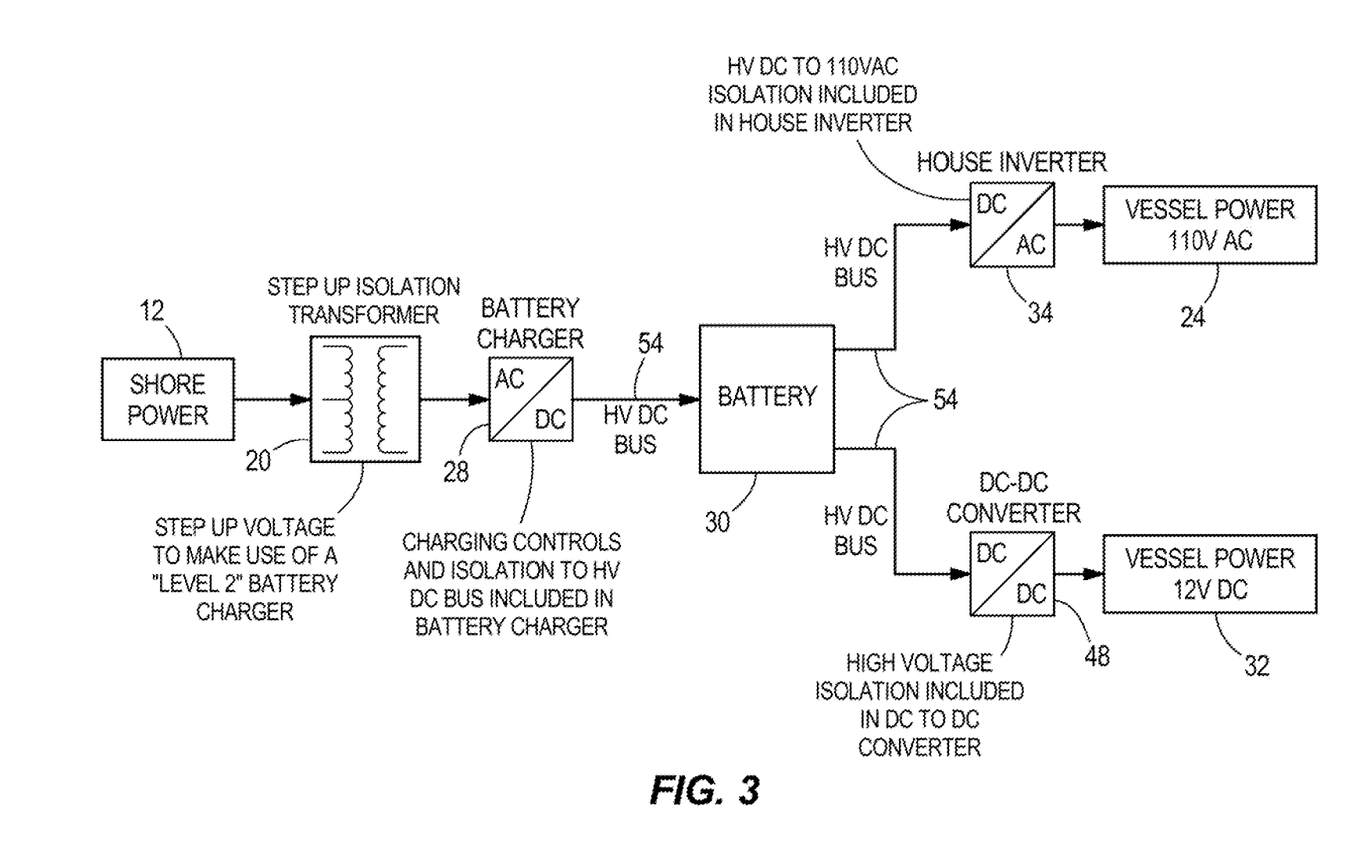
FIG. 3 is like FIG. 2 and shows another embodiment.

In one embodiment, a DC bus 54, which may be a high voltage (HV) DC bus, is connected to AC/DC inverter 28, battery 30, DC/AC inverter 34, and DC/DC converter 48. This is also illustrated in FIG. 3 which uses like reference numerals from above where appropriate to facilitate understanding.

Figure 4:
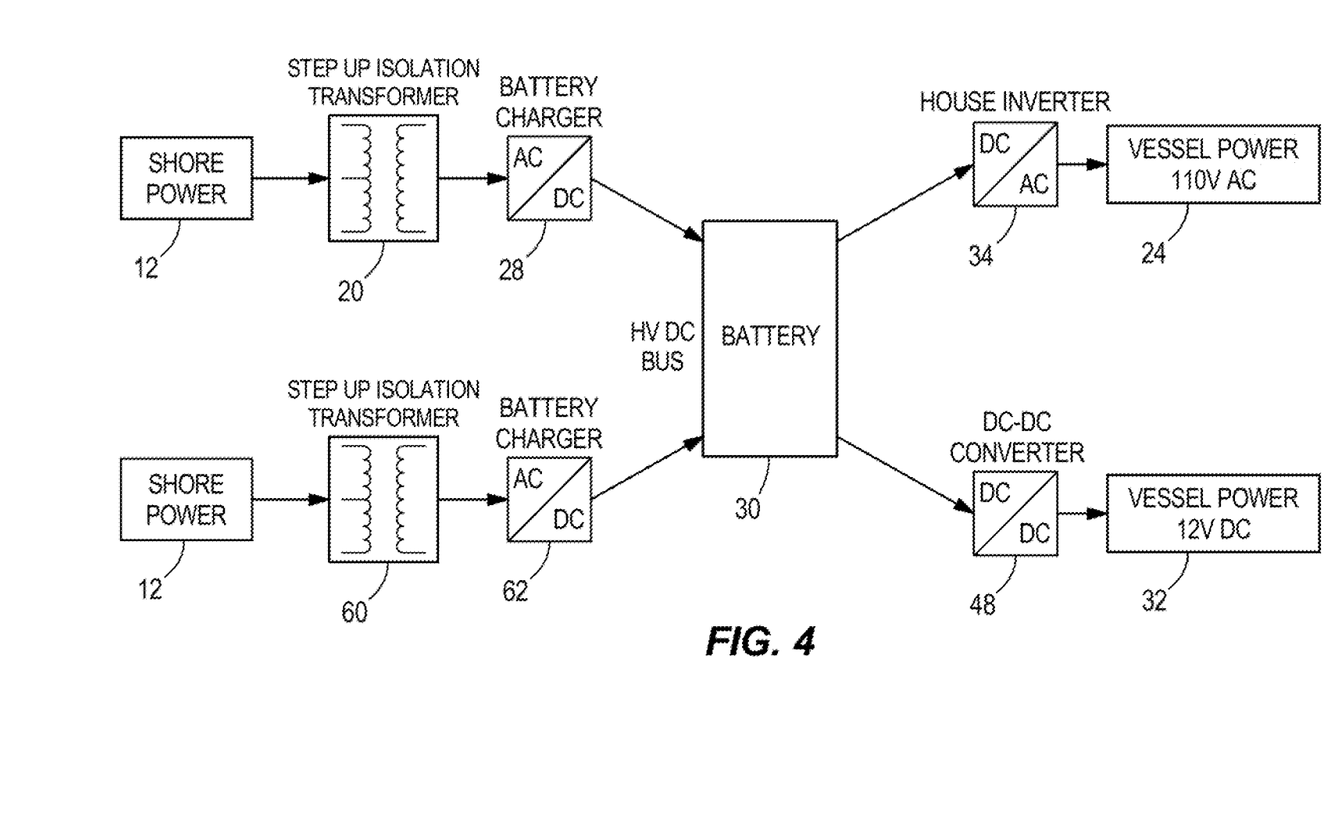
FIG. 4 is like FIG. 3 and shows another embodiment.
Figure 5:
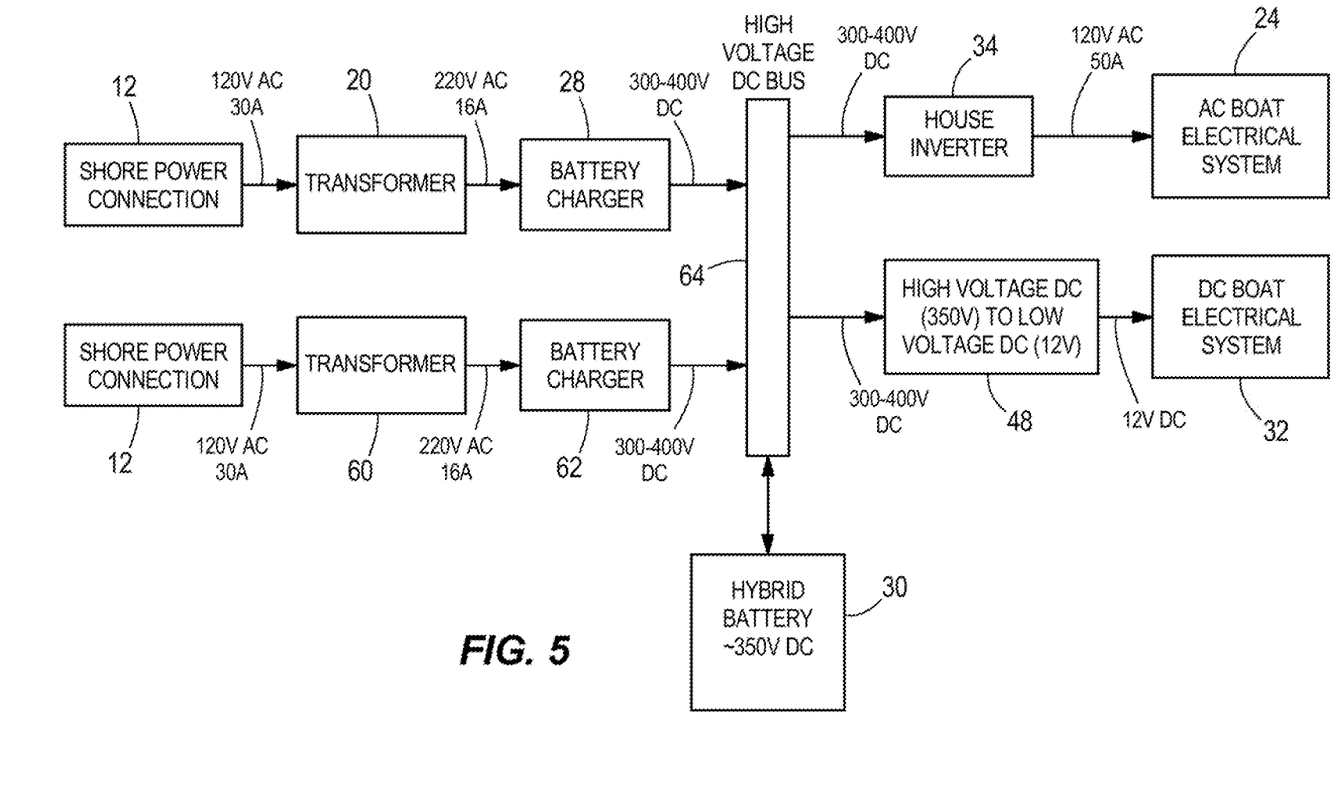
FIG. 5 is like FIG. 4 and shows another embodiment.

In a further embodiment, FIG. 4, another isolation transformer 60 receives AC shore electrical power and outputs AC electrical power, and another AC/DC inverter 62 receives the AC electrical power from isolation transformer 60 and outputs DC electrical power, and a DC bus is connected to each of the first and second AC/DC inverters 28 and 62. This is further illustrated in FIG. 5 showing high voltage DC bus 64 and exemplary voltage and current ranges used in one embodiment, where like reference numerals are used from above where appropriate to facilitate understanding.

The system includes a method of providing AC shore electrical power to a docked marine vessel, including connecting an isolation transformer to an AC shore power supply to receive AC shore electrical power therefrom, outputting AC electrical power from the isolation transformer, receiving the AC electrical power from the isolation transformer at an AC/DC inverter, outputting DC electrical power from the AC/DC inverter, providing a DC/AC inverter receiving DC electrical power and outputting AC electrical vessel power for the marine vessel, and providing the AC electrical vessel power to power supply 24 without pass-through of the AC electrical power from the isolation transformer which would otherwise bypass the AC/DC inverter. The method includes providing all of the AC electrical vessel power to power supply 24 in series through the AC/DC inverter without a parallel output connection from the isolation transformer which would otherwise bypass the AC/DC inverter. The method includes providing all of the AC electrical vessel power to power supply 24 in two inversions comprising a first inversion from AC to DC at the AC/DC inverter, and a second inversion from DC to AC at the DC/AC inverter, all without a direct connection of AC electrical power from the isolation transformer, such that all of the AC electrical vessel power to power supply 24 is first inverted from AC to DC and then re-inverted from DC to AC. The method includes providing a DC/DC converter receiving DC electrical power and outputting DC electrical vessel power for the marine vessel. The method includes providing a battery receiving DC electrical power from the AC/DC inverter and outputting DC electrical power, wherein the DC/AC inverter receives DC electrical power from at least one of the group consisting of: the battery; the AC/DC inverter, and both the battery and the AC/DC inverter.

In one embodiment, the disclosure provides a marine electrical power system as noted above. In other embodiments, the disclosure provides an electrical system connectable to an AC base power supply to provide AC base electrical power to a mobile unit, wherein the AC base power supply may be an AC shore power supply or other power supplies, the AC base electrical power may be AC shore electrical power or other electrical power, and the mobile unit may be a docked marine vessel, a Class A semi-tractor/trailer, an RV, an industrial work truck, and so on.

Figure 6:
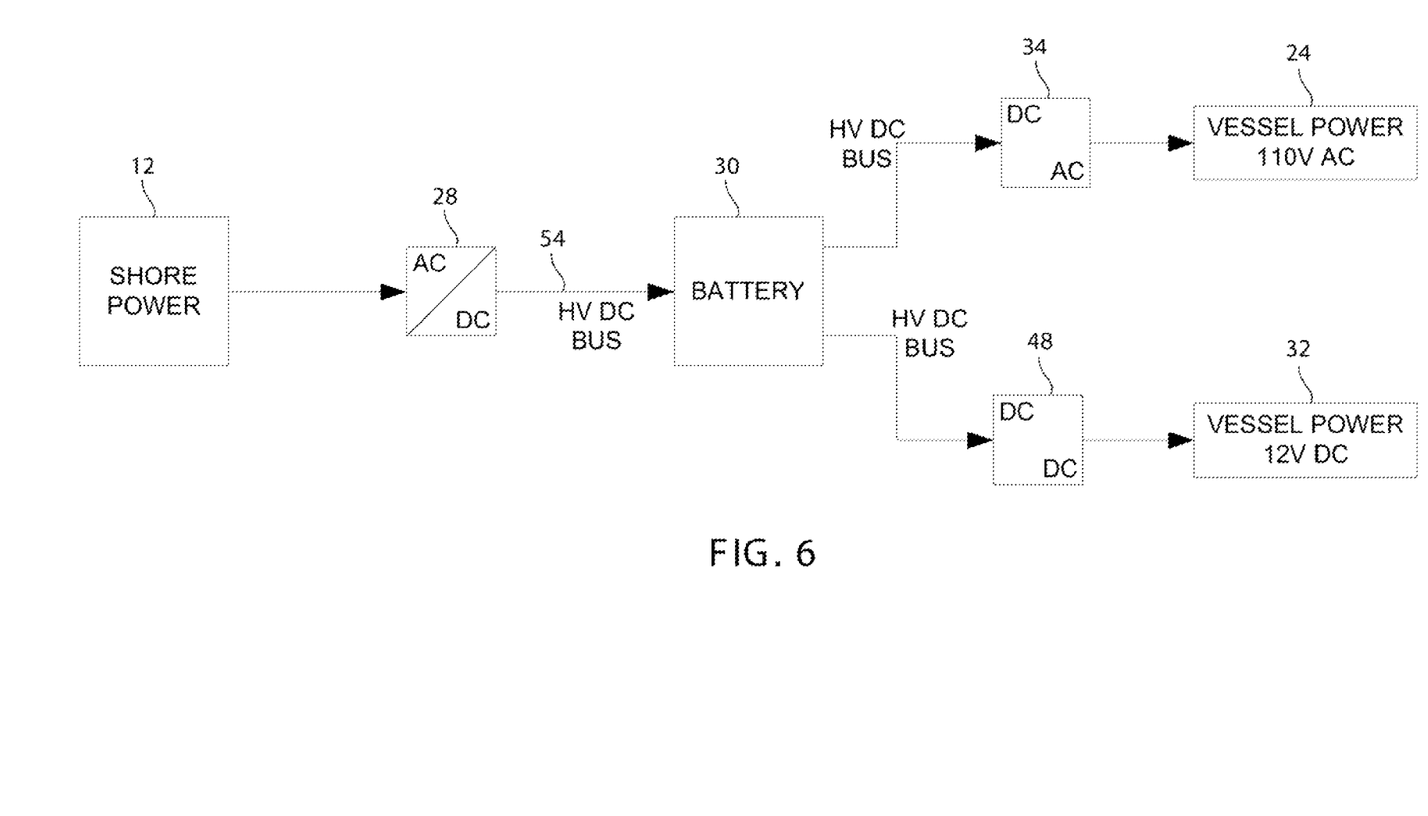
FIG. 6 is like FIG. 3 and shows another embodiment.
Figure 7:
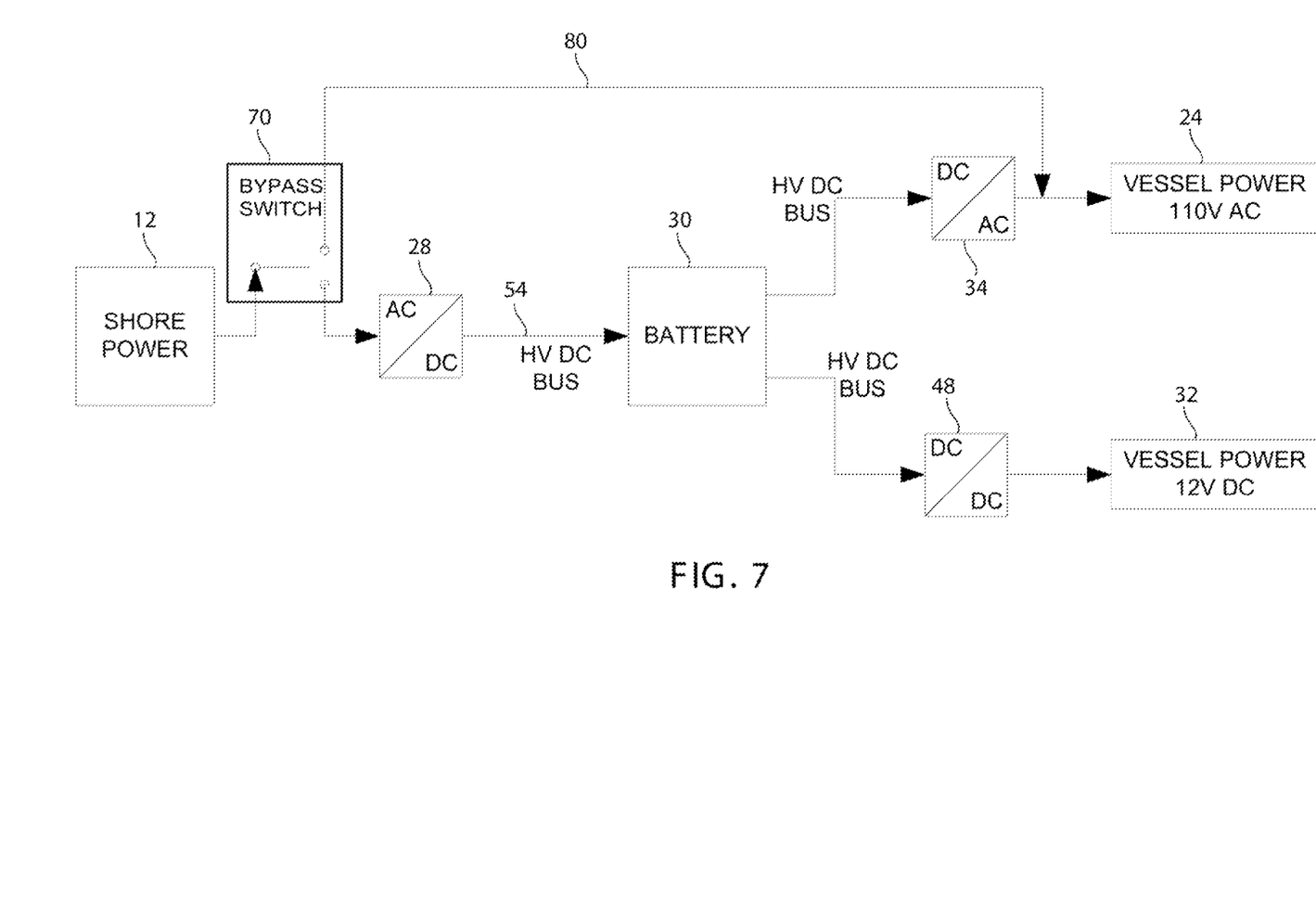
FIG. 7 is like FIG. 6 and shows another embodiment.
Figure 8:
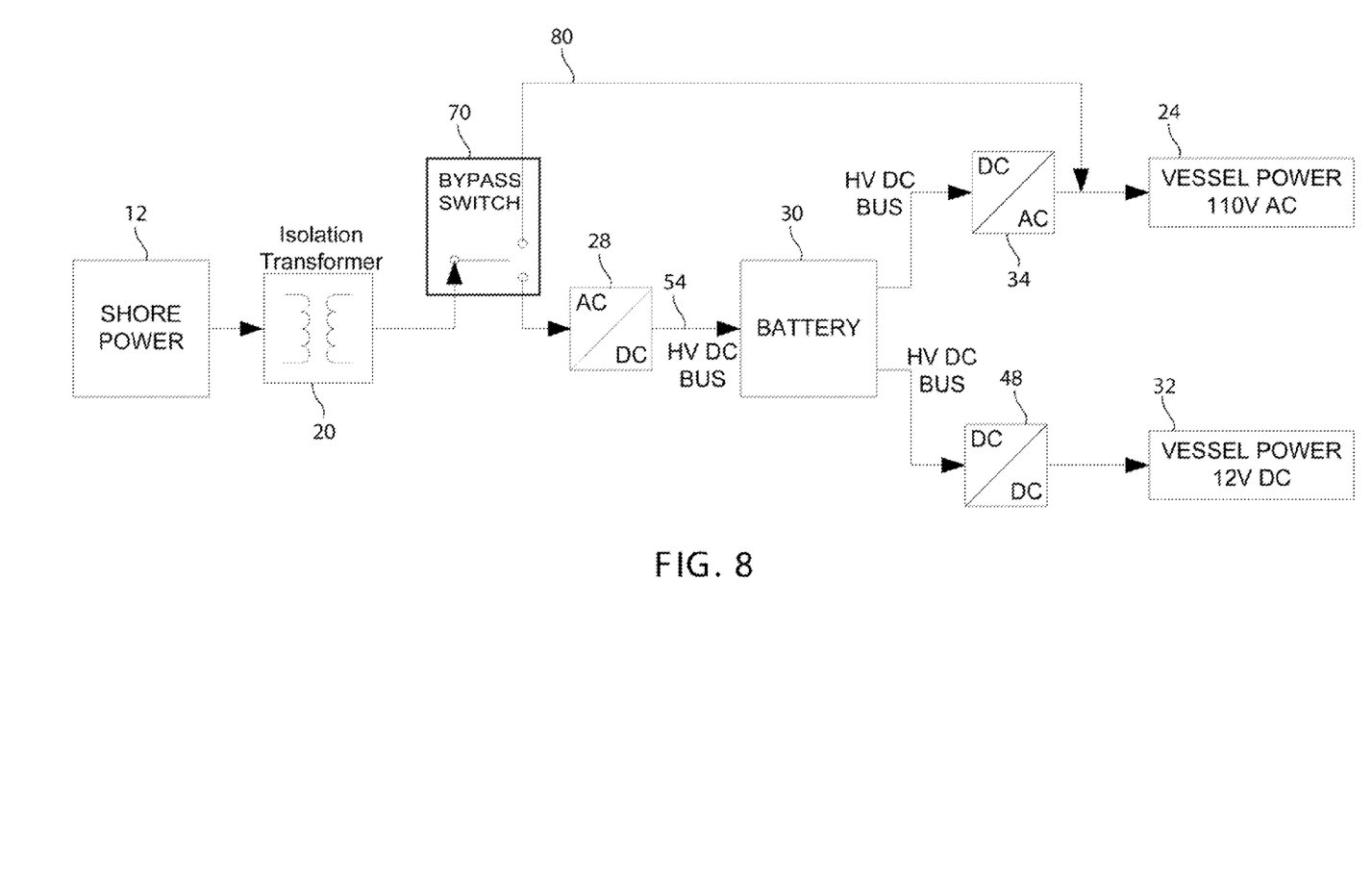
FIG. 8 is like FIG. 7 and shows another embodiment.
Figure 9:
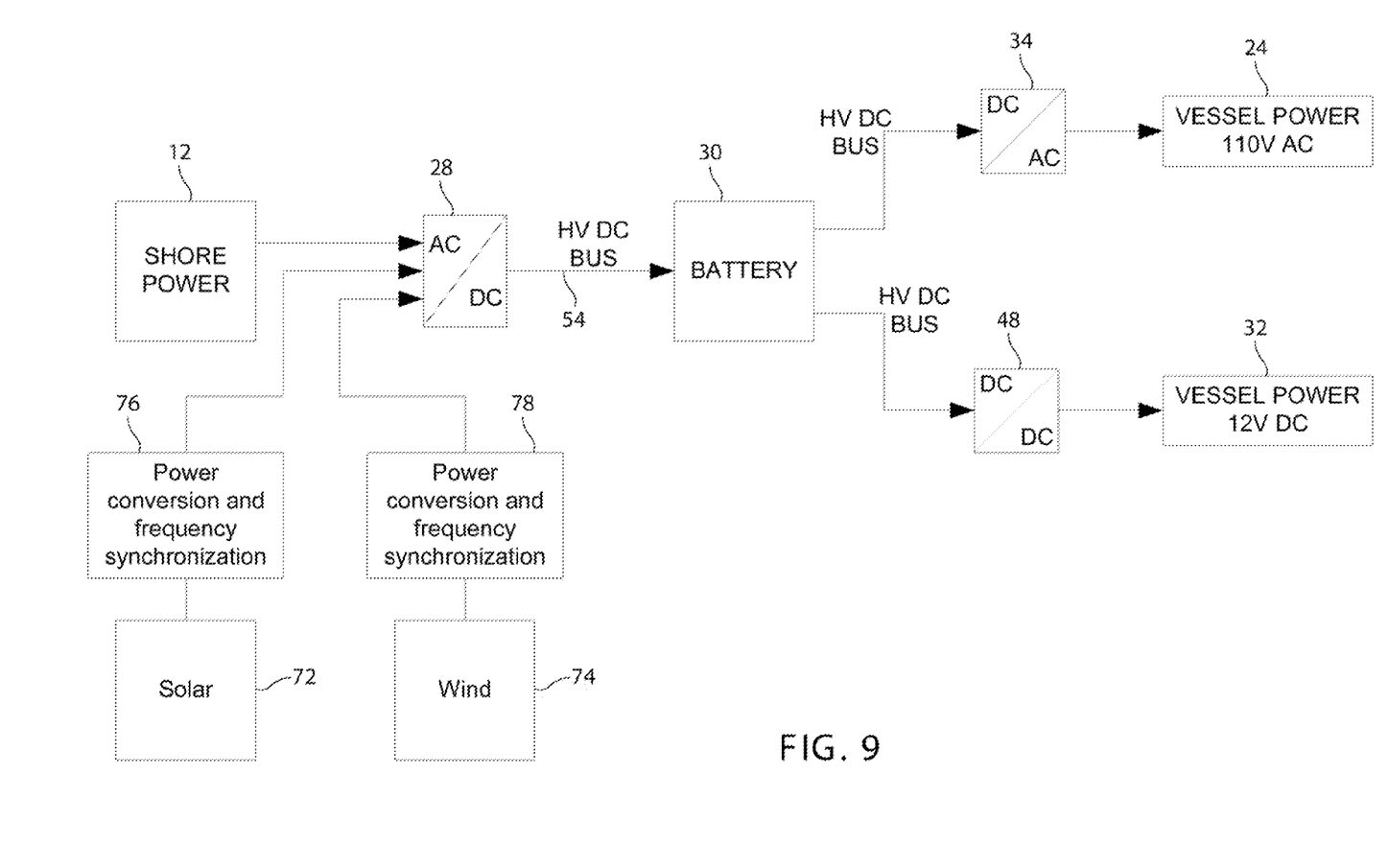
FIG. 9 is like FIG. 6 and shows another embodiment.
Figure 10:
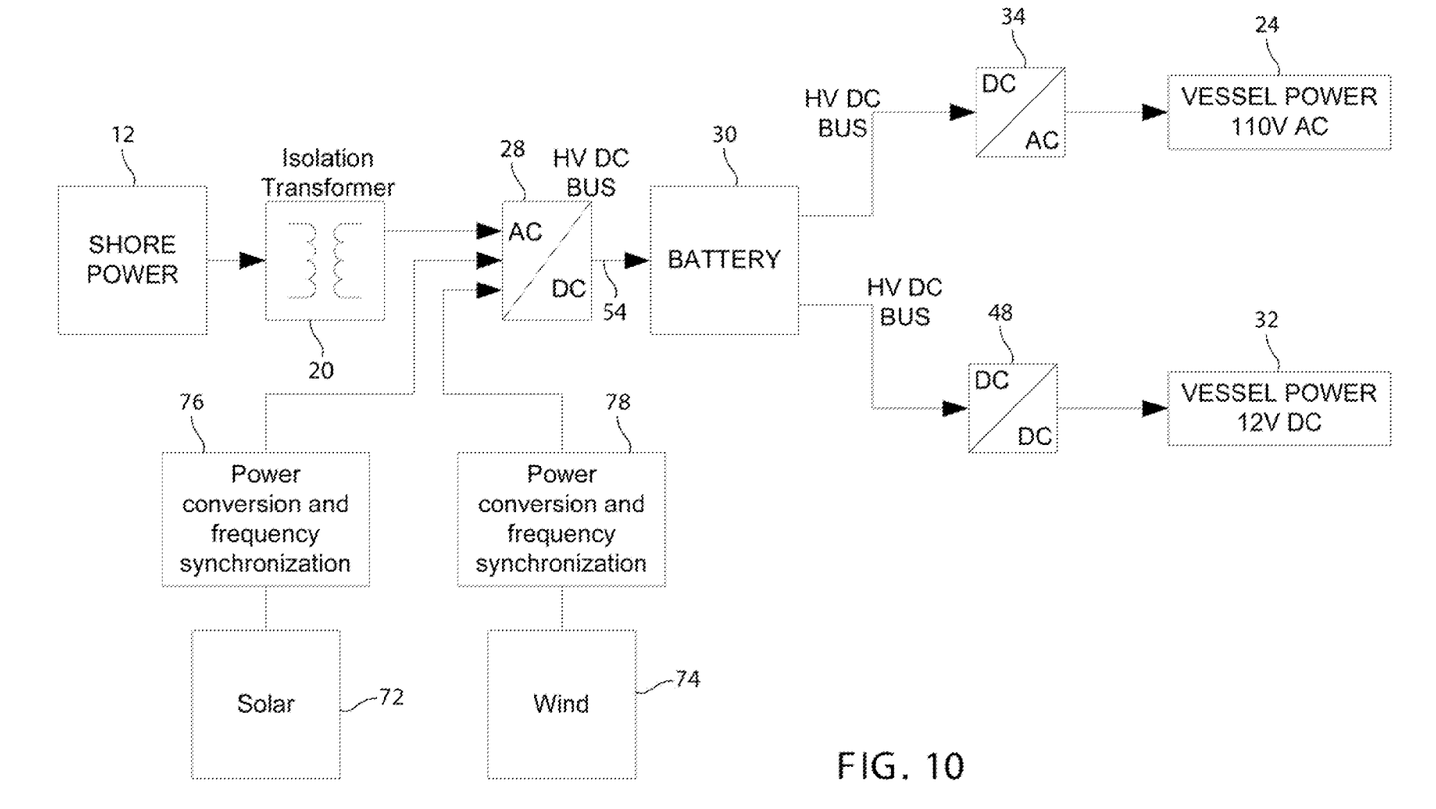
FIG. 10 is like FIG. 9 and shows another embodiment.
Figure 11:
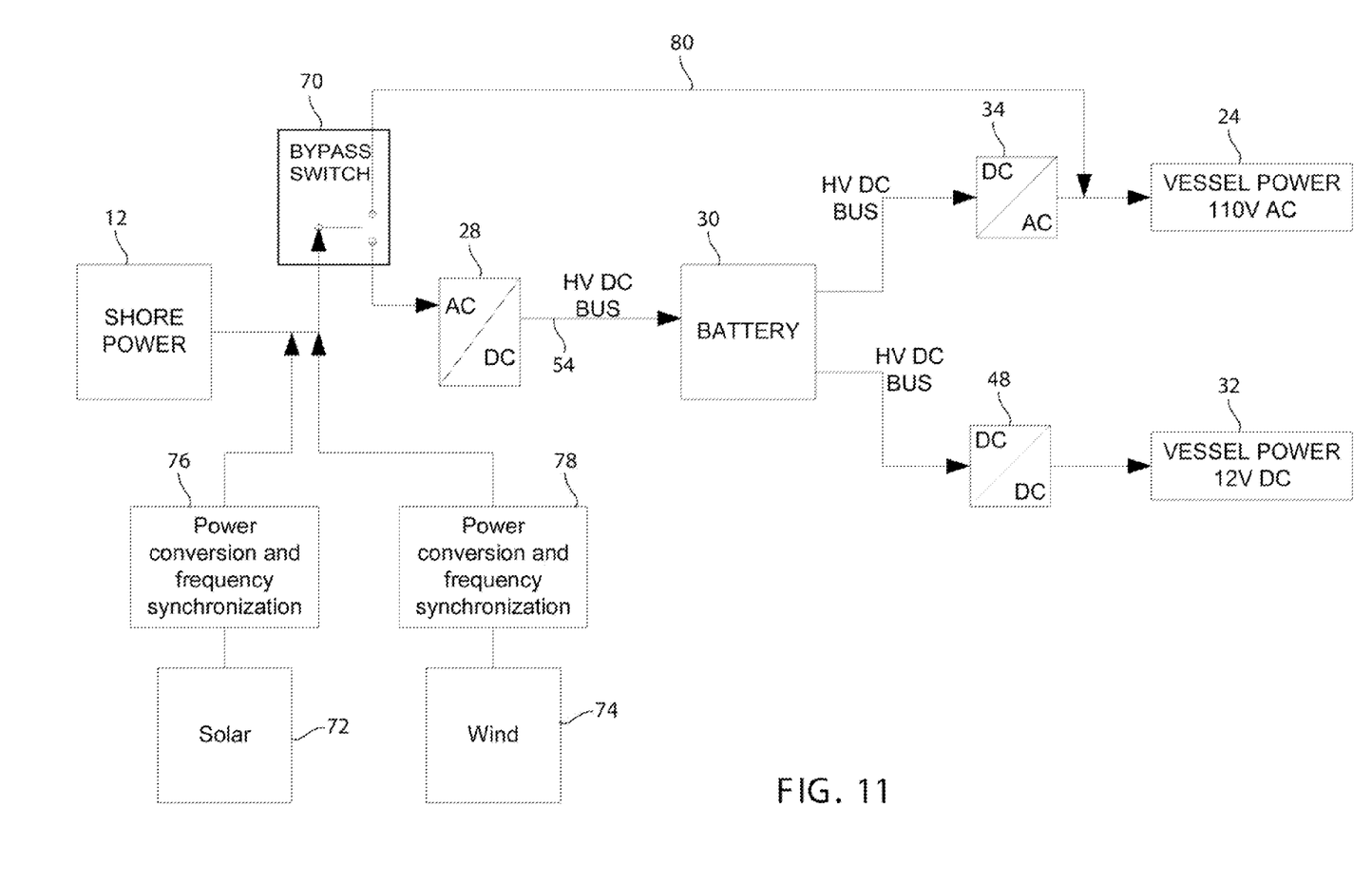
FIG. 11 is like FIG. 9 and shows another embodiment.
Figure 12:
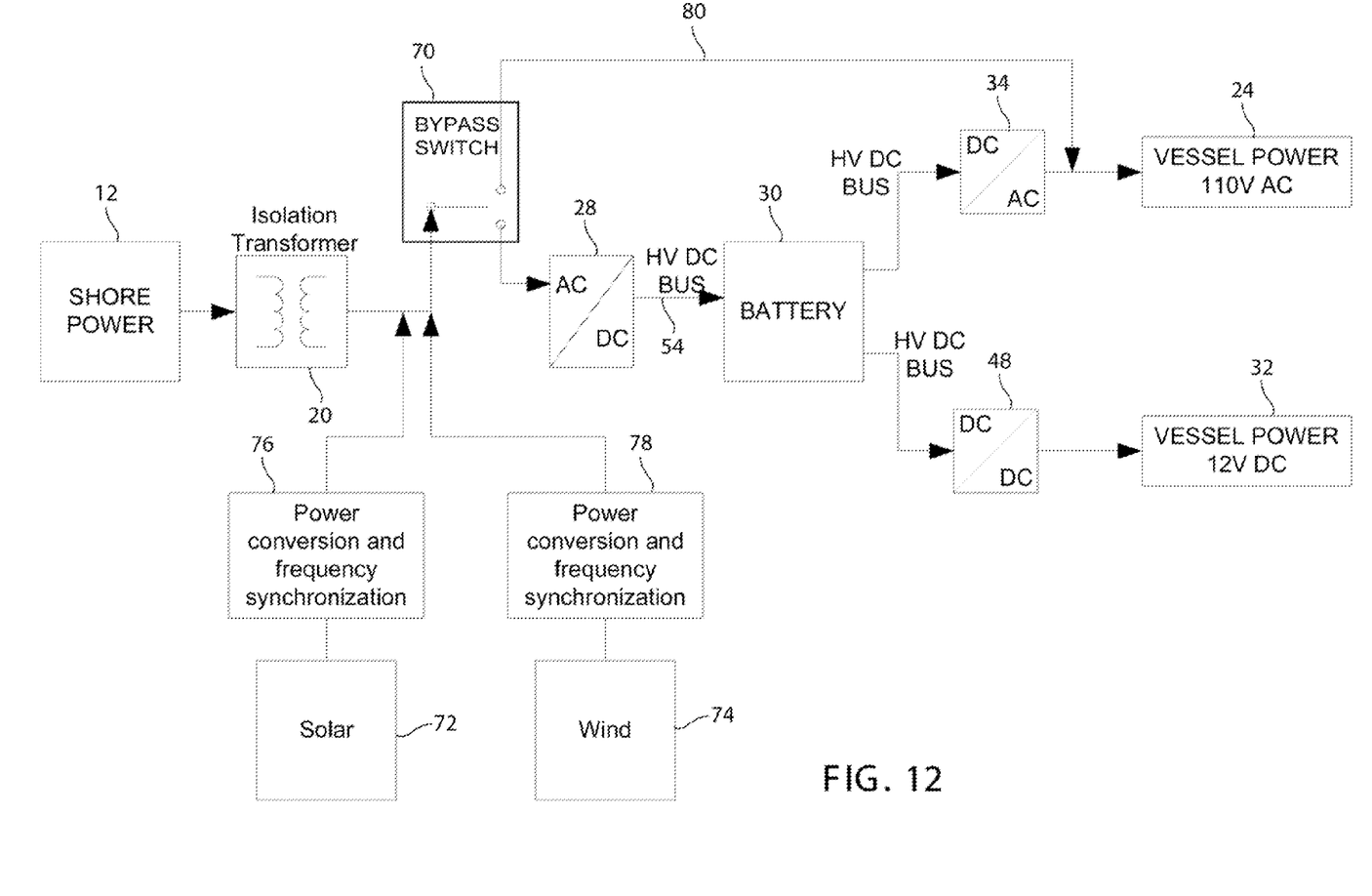
FIG. 12 is like FIG. 10 and shows another embodiment.

FIGS. 6-12 show further alternate embodiments and use like reference numerals from above where appropriate to facilitate understanding. FIG. 6 is like FIG. 3 but eliminates the isolation transformer 20 of the latter. FIG. 7 is like FIG. 6 and additionally includes an optional bypass switch 70, to be described. FIG. 8 is like FIG. 7 and includes isolation transformer 20. FIG. 9 is like FIG. 6 and includes alternative energy sources such as solar at 72, wind at 74, and respective power conversion and frequency synchronization circuitry 76, 78. FIG. 10 is like FIG. 9 and additionally includes isolation transformer 20. FIG. 11 is like 9 and includes optional bypass switch 70. FIG. 12 is like FIG. 11 and additionally includes isolation transformer 20. In those embodiments employing an optional bypass switch such as 70, the AC mobile unit electrical power provided to AC mobile unit power supply 24 without pass-through of the AC base electrical power is provided along a first circuit path such as 54, and in combination the bypass switch 70 selectively provides AC base electrical power along a second circuit path 80 from the AC base power supply 12 and/or 72 and/or 74 to the AC mobile unit power supply 24 bypassing the AC/DC inverter 28. In various embodiments, power is supplied along one or the other of first and second circuit paths 54 and 80 or along both such circuit paths 54 and 80.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. An electrical system connectable to an AC base power supply to provide AC base electrical power to a mobile unit, comprising an AC/DC inverter receiving said AC base electrical power and outputting DC electrical power, a DC/AC inverter receiving DC electrical power and outputting AC mobile unit electrical power for said mobile unit to an AC mobile unit power supply, said AC mobile unit electrical power being provided to said AC mobile unit power supply without pass-through of said AC base electrical power which would otherwise bypass said AC/DC inverter;
   a battery receiving DC electrical power from said AC/DC inverter and outputting DC electrical power; and
   wherein said DC/AC inverter receives DC electrical power from both said battery and said AC/DC inverter.

2. The electrical system according to claim 1 wherein all of said AC mobile unit electrical power to said AC mobile unit power supply is provided in series through said AC/DC inverter without a parallel output connection from said AC base power supply which would otherwise provide AC mobile unit electrical power which would bypass said AC/DC inverter.

3. The electrical system according to claim 1 wherein all of said AC mobile unit electrical power to said AC mobile unit power supply results from two inversions comprising a first inversion from AC to DC at said AC/DC inverter, and a second inversion from DC to AC at said DC/AC inverter, all without a direct connection of AC electrical power from said AC base power supply, such that all of said AC mobile unit electrical power to said AC mobile unit power supply is first inverted from AC to DC and then re-inverted from DC to AC.

4. The electrical system according to claim 1 wherein at least one of said AC/DC and said DC/AC inverters includes an isolation transformer.

5. The electrical system according to claim 1 wherein said AC/DC inverter is a first AC/DC inverter, and comprising a second AC/DC inverter receiving said AC base electrical power and outputting DC electrical power, and a DC bus connected to each of said first and second AC/DC inverters.

6. The electrical system according to claim 1 comprising a DC bus connected to each of said DC/AC inverter and a DC/DC converter, said DC/DC converter receiving said DC electrical power and outputting DC mobile unit electrical power for said mobile unit.

7. The electrical system according to claim 6 wherein said AC/DC inverter is a first AC/DC inverter, and comprising a second AC/DC inverter receiving said AC base electrical power and outputting DC electrical power, wherein said DC bus is connected to each of said first AC/DC inverter, said second AC/DC inverter, said DC/AC inverter, and said DC/DC converter.

8. The electrical system according to claim 1 wherein said AC mobile unit electrical power provided to said AC mobile unit power supply without pass-through of said AC base electrical power is provided along a given circuit path having two inversions comprising a first inversion from AC to DC at said AC/DC inverter, and a second inversion from DC to AC at said DC/AC inverter, such that said AC mobile unit electrical power to said AC mobile unit power supply along said given circuit path without said pass-through is first inverted from AC to DC and then re-inverted from DC to AC.

9. The electrical system according to claim 1 wherein said AC mobile unit electrical power supplied to said AC mobile unit power supply without pass-through of said AC base electrical power is provided along a first circuit path, and comprising in combination a bypass switch providing AC base electrical power along a second circuit path from said AC base power supply to said AC mobile unit power supply bypassing said AC/DC inverter.

10. The electrical system according to claim 1 wherein said electrical system is a marine electrical system connectable to an AC shore power supply to provide AC shore electrical power to a docked marine vessel.

11. An electrical system connectable to an AC base power supply to provide AC base electrical power to a mobile unit, comprising an AC/DC inverter receiving said AC base electrical power and outputting DC electrical power, a DC/AC inverter receiving DC electrical power and outputting AC mobile unit electrical power for said mobile unit to an AC mobile unit power supply, said AC mobile unit electrical power being provided to said AC mobile unit power supply without pass-through of said AC base electrical power which would otherwise bypass said AC/DC inverter;
  wherein at least one of said AC/DC and said DC/AC inverters includes an isolation transformer; and
  wherein said AC/DC inverter includes a first isolation transformer, and said DC/AC inverter includes a second isolation transformer.

12. The electrical system according to claim 11 comprising a DC/DC converter receiving said DC electrical power and outputting DC mobile unit electrical power for said mobile unit.

13. The electrical system according to claim 11 comprising a battery receiving DC electrical power from said AC/DC inverter and outputting DC electrical power.

14. The electrical system according to claim 13 wherein said DC/AC inverter receives DC electrical power at least from said battery.

15. The electrical system according to claim 13 wherein said DC/AC inverter receives DC electrical power at least from said AC/DC inverter.

16. A method of providing AC base electrical power to a mobile unit, comprising connecting an AC/DC inverter to an AC base power supply to receive AC base electrical power therefrom, outputting DC electrical power from said AC/DC inverter, providing a DC/AC inverter receiving DC electrical power and outputting AC mobile unit electrical power for said mobile unit to an AC mobile unit power supply that outputs said AC mobile unit electrical power to said mobile unit, providing said AC mobile unit electrical power to said AC mobile unit power supply without pass-through of said AC base electrical power which would otherwise bypass said AC/DC inverter, and providing a battery receiving DC electrical power from said AC/DC inverter and outputting DC electrical power, and wherein said DC/AC inverter receives DC electrical power from both said battery and said AC/DC inverter.

17. The method according to claim 16 comprising providing all of said AC mobile unit electrical power to said AC mobile unit power supply in series through said AC/DC inverter without a parallel output connection from said AC base power supply which would otherwise bypass said AC/DC inverter.

18. The method according to claim 16 comprising providing all of said AC mobile unit electrical power to said AC mobile unit power supply in two inversions comprising a first inversion from AC to DC at said AC/DC inverter, and a second inversion from DC to AC at said DC/AC inverter, all without a direct connection of AC electrical power from said AC base power supply, such that all of said AC mobile unit electrical power to said AC mobile unit power supply is first inverted from AC to DC and then re-inverted from DC to AC.

19. The method according to claim 16 comprising providing a DC/DC converter receiving said DC electrical power and outputting DC mobile unit electrical power for said mobile unit.

20. The method according to claim 16 comprising providing said AC mobile unit electrical power to said AC mobile unit power supply along a given circuit path without pass-through of said AC base electrical power, providing said given circuit path with two inversions comprising a first inversion from AC to DC at said AC/DC inverter, and a second inversion from DC to AC at said DC/AC inverter, such that said AC mobile unit electrical power to said AC mobile unit power supply along said given circuit path without said pass-through is first inverted from AC to DC and then re-inverted from DC to AC.

21. The method according to claim 16 comprising providing said AC mobile unit electrical power to said AC mobile unit power supply without pass-through of said AC base electrical power along a first circuit path, and comprising in combination providing a bypass switch providing AC base electrical power along a second circuit path from said AC base power supply to said AC mobile unit power supply bypassing said AC/DC inverter.

* * * * *